United States Patent [19]
Dupuy

[11] Patent Number: 5,701,584
[45] Date of Patent: Dec. 23, 1997

[54] CELLULAR MOBILE RADIO SYSTEM HAVING A FREQUENCY REUSE PLAN WITH PARTIALLY IDENTICAL PATTERNS

[75] Inventor: Pierre Dupuy, Paris, France

[73] Assignee: Alcatel Mobile Communication France, Paris, France

[21] Appl. No.: 399,034

[22] Filed: Mar. 6, 1995

[30] Foreign Application Priority Data

Mar. 8, 1994 [FR] France ................... 94 02661

[51] Int. Cl.$^6$ ................................................. H04B 7/00
[52] U.S. Cl. ........................... 455/33.1; 455/34.1; 455/63
[58] Field of Search .................... 455/33.1, 33.4, 455/33.3, 33.2, 34.1, 63, 56.1; 379/59; 370/329, 337

[56] References Cited

U.S. PATENT DOCUMENTS

| | | | |
|---|---|---|---|
| 5,073,971 | 12/1991 | Scgaeffer | 455/33.1 |
| 5,355,367 | 10/1994 | Comroe et al. | 455/33.1 |
| 5,408,496 | 4/1995 | Ritz et al. | 455/33.4 |
| 5,548,806 | 8/1996 | Yamaguchi et al. | 455/33.1 |

FOREIGN PATENT DOCUMENTS

| | | |
|---|---|---|
| 0189695A1 | 8/1986 | European Pat. Off. . |
| WO9322849 | 11/1993 | WIPO . |

OTHER PUBLICATIONS

*IEEE Journal On Selected Areas In Communication*, vol. 5, No. 5, Jun. '87, NY, US, pp. 835–848; Dornstetter et al, "Cellular Efficiency with Slow Frequnecy Hopping: Analysis of the Digital SFH900 Mobile System".

*IEEE International Conference On Communications*, vol. 2, Jun. 1986, Toronto, CA, pp. 1151–1155; Dornstetter et al, "The Digital Cellular SFH 900 System".

*Primary Examiner*—Reinhard J. Eisenzopf
*Assistant Examiner*—Lester G. Kincaid
*Attorney, Agent, or Firm*—Sughrue, Mion, Zinn, Macpeak & Seas, PLLC

[57] ABSTRACT

In a cellular mobile radio system including a plurality of cells grouped into identical patterns, each of at least two cells, repeated periodically in space and such that: each cell is associated with one or more base transceiver stations to send radio signals to or to receive radio signals from mobile stations. Each transceiver station sends and receives radio signals using a set of frequencies associated with its cell and including at least two different frequencies, all the frequencies of sets of frequencies associated with cells of the same pattern being different. The frequency of the signals exchanged between a mobile station and a base transceiver station of a cell changes in time with the result that several frequencies of the set of frequencies associated with the cell are used successively during the transmission. In this system, the plan of the mobile radio system is obtained by superposing the plans of a plurality of mobile radio systems each having a different number of cells per pattern.

14 Claims, 4 Drawing Sheets

CELLULAR MOBILE RADIO SYSTEM HAVING A FREQUENCY REUSE PLAN WITH PARTIALLY IDENTICAL PATTERNS

BACKGROUND OF THE INVENTION

1. Field of the Invention

The present invention concerns a cellular mobile radio system.

2. Description of the Prior Art

In prior art cellular mobile radio systems, mobile stations communicate via transmit/receive means such as base transceiver stations which are fixed installations.

The geographical coverage area of a base transceiver station is called a cell and is the area in which the electric field received by a mobile station is sufficient for it to operate normally. These cells are schematically represented by hexagons.

Each cell has a frequency or a set of different frequencies for radio signals exchanged between the base transceiver station and the mobile station in its coverage area. The number of frequencies allocated to each cell depends in theory on the expected communication traffic within that cell: for low-traffic cells a single frequency is needed whereas for high-traffic cells at least two different frequencies are needed. Usually (but not always) there is one frequency for each transmission direction.

Beyond a limiting distance from the base transceiver station the electric field received is very weak; interaction between two signals transmitted on the same frequency and separated by at least the aforementioned limiting distance is therefore practically imperceptible. It is therefore possible to re-use frequencies. This re-use of frequencies leads to the constitution of groups (also called patterns) of cells, the number of cells per pattern (at least two) depending on the number of frequencies available.

A given pattern uses only frequencies from its set of different frequencies and the patterns, which are identical, i.e. constituted of identical cells, are repeated periodically to provide radio coverage over the required area. This repetition is usually regular, i.e. the relative positions of the patterns are identical. Nevertheless, regular repetition is not mandatory, in particular if there are irregularities in the coverage area.

In prior art systems all like cells, i.e. cells in different patterns occupying within these patterns identical positions relative to the other cells of the pattern, use identical frequencies or sets of frequencies.

Because the frequency spectrum available for mobile radio systems is limited, a compromise has to be arrived at between use of a minimal number of frequencies and the quality of the radio signals transmitted, especially signals containing speech.

The quality of the signals is affected in practise by two main phenomena.

The first of these is fading caused by multiple propagation of the radio waves: the propagation path of the radio waves varies according to obstacles encountered (buildings, terrain, metal objects, etc), which leads to the receiver picking up the same signal more than once with differing time-delays. The situation creates a system of stationary waves at the nodes of which the resultant signal disappears or virtually disappears. This phenomenon is known as Rayleigh fading.

The position of the nodes of the system of standing waves is obviously related to the frequency used to transmit the signals and to the relative positions of the transmitter, the receiver and the obstacles; to be more precise, it depends on the wavelength of the signal transmitted and on the respective distances between the obstacle and the transmitter and between the obstacle and the receiver, which determine the degree of fading.

Beyond a lower limit for the received signal level the receiver is no longer able to use the received signal, which means that the content of the information transmitted does not reach its destination. This obviously represents serious deterioration in signal quality, especially if the signal is always transmitted on the same frequency.

To reduce the effects of fading the frequency can be changed cyclically; this reduces the duration of fading to the point where the phenomenon becomes imperceptible to the user. This principle is called cyclic frequency hopping.

When this principle is applied, each cell of the system is associated with at least two different frequencies and the frequency of the radio signals exchanged between a mobile station and a base transceiver station changes in time: all the frequencies of the set of frequencies associated with the cell concerned are used in succession during the transmission of radio signals; the time succession of these frequencies is cyclic and is known to the mobile station and to the base transceiver station.

If fading occurs for a given signal transmission on a frequency of the set of frequencies associated with the cell concerned, this set of frequencies comprising n frequencies used one after the other in a predetermined order in accordance with the principle of cyclic frequency hopping, fading occurs during only a fraction (1/n) of each cycle, which significantly improves transmission quality as compared to the situation in which the signals are transmitted only on the frequency at which fading occurs.

The second phenomenon by which the quality of the radio signals transmitted is degraded is interference. Because of the limited spectrum available and the small radius of cells in some high-traffic areas, it can happen that two relatively close together cells use the same frequency or the same set of frequencies.

In this case, the transmission of radio signals between base transceiver stations and mobile stations in these two cells may interfere with each other, leading to virtually complete jamming of the radio signals, and consequently to very serious deterioration of transmission quality.

The problem of interference is obviously a general problem, i.e. it is not related to the use in the mobile radio system concerned of the cyclic frequency hopping principle.

Although cyclic frequency hopping improves transmission quality in the presence of fading, it is not satisfactory in the case of interference. Transmission of radio signals can begin at the same time in like cells, which it will be remembered are associated with the same set of frequencies. The cycle that is followed in this case, which is usually the same for like cells, is exactly the same during this transmission in each of these cells (this can happen at least one time in n where n is the number of frequencies in the set of frequencies associated with the cell concerned). The problem of interference is not solved by application of the cyclic frequency hopping principle in such cases, which occur relatively frequently.

As a general rule, in prior art mobile radio systems the patterns comprise seven cells each, i.e. a central cell and six peripheral cells. In this particular case each cell is "near" six like cells which therefore constitute six potential sources of total jamming of transmissions.

Random frequency hopping can be used to reduce the effect of interference. Application of this principle and of the cyclic frequency hopping principle are mutually exclusive.

In random frequency hopping, rather than changing in time in a cyclic manner, the radio signal transmission frequency changes at random, in accordance with a random hopping law allocated by the network to each channel when it is activated, using frequencies of the set of frequencies associated with the cell concerned. In practise the frequency hopping is not truly random. The frequencies are not chosen at random during transmission of the signals, but rather in accordance with a predetermined random type law so that the frequency hopping might more accurately be termed "pseudo-random"; the expression "random" is used to indicate that there is no or only partial correlation between the successive frequencies.

In some systems, and in particular in GSM systems, the signals conveying signalling must always be transmitted on the same frequency called the signalling frequency. The cyclic or random frequency hopping principle is therefore not applied to the transmission of these signals.

The random frequency hopping principle significantly reduces the probability of two transmissions in nearby cells using the same sets of frequencies interfering which each other since, by virtue of the random nature of the time succession of the frequencies, the risk of two transmissions using the same frequency at the same time in a given period is substantially reduced (in practise it is substantially less than 1/n where n is the number of frequencies available in each cell). Using the random frequency hopping principle equalizes the levels of interference on each frequency by spreading the sources of jamming.

However, application of the random frequency hopping principle raises a problem in that a frequency on which fading occurs for a given transmission may be "over-represented", i.e. used several times in succession during a relative short period, since the frequencies of the set of frequencies associated with the cell concerned are not used one after the other in a cyclic manner.

For example, if the set of frequencies comprises the frequencies $f_1$, $f_2$, $f_3$, if $f_1$ is the frequency on which fading occurs, and if the sequence of frequencies on random hopping $f_1$ $f_1$ $f_1$ $f_2$ $f_1$ $f_3$ $f_1$ $f_1$ . . . , the times at which transmission quality is seriously degraded are more numerous than in the situation in which cyclic frequency hopping is applied.

In the light of what has been said above, an object of the present invention is to provide a cellular mobile radio system in which the spectrum of available frequencies is used optimally whilst minimizing deterioration in transmission radio signal quality due to fading and interference.

IEEE Journal On Selected Areas in Communication, vol. 5 n° 5, Jun. 1987, New York U.S., pages 835–848, DORNSTETTER ET AL. "Cellular Efficiency with Slow Frequency Hopping: Analysis of the Digital SFH 900 Mobile System" describes a cellular mobile radio system in which the sets of frequencies associated with any two cells belonging to different and adjacent patterns and occupying within these respective patterns the same position relative to the other cells of those patterns are partially identical, i.e. comprise at least one identical frequency and at least one different frequency.

However, the object of the system as described in the above prior art document is not optimum use of the available frequency spectrum with minimized deterioration in transmitted radio signal quality due to fading and interference, but rather to enable the use of patterns with a small number of cells (specifically with three cells), despite the high levels of interference which usually occur in such circumstances, which is achieved by increasing the number of frequencies available and using sets of frequencies which are no longer totally identical, but only partly identical, at each new frequency re-use distance.

The present invention uses this feature of partially identical sets of frequencies associated with like cells to provide a cellular mobile radio system in which the spectrum of available frequencies is used optimally whilst minimizing deterioration in transmitted radio signal quality due to fading and interference.

By choosing a number P of patterns for which the sets of frequencies associated in this way with the like cells are partially identical which has a particular relationship to the number N of cells in a pattern the invention achieves an additional result which cannot be achieved by the system described in the prior art document analyzed above; this additional result is improved geographic diversity of the jamming sources.

SUMMARY OF THE INVENTION

The present invention consists in a cellular mobile radio system comprising a plurality of cells grouped into identical patterns each of at least two cells repeated periodically in space and such that:

each cell is associated with base transceiver means adapted to send radio signals to or to receive radio signals from mobile stations when the latter are located in a geographical area substantially coincident with the cell associated with said transceiver means, each of said transceiver means sends and receives radio signals using a set of frequencies associated with said associated cell and including at least two different frequencies, all the frequencies of sets of frequencies associated with cells of the same pattern being different, the frequency of the radio signals exchanged between a mobile station and the transceiver means of a cell changes in time with the result that several frequencies of the set of frequencies associated with said cell are used successively during the transmission of said radio signals, the sets of frequencies associated with any two like cells of different and adjacent patterns, i.e. cells occupying inside said respective patterns the same position relative to the other cells of the patterns, are partially identical, i.e. include at least one identical frequency and at least one different frequency, said system being characterized in that the plan of said mobile radio system is obtained by superposing the plans of a plurality of mobile radio systems each having a different number of cells per pattern, these mobile radio systems being conventional systems, i.e. systems in which the sets of frequencies associated with like cells are identical.

By virtue of the system of the invention, two cells associated with exactly the same frequencies are a much greater distance apart than in conventional systems in which the like cells of adjacent patterns are associated with the same set of frequencies. In this way total jamming of transmission is virtually eliminated.

On the other hand, for a given cell of the system of the invention there is a greater number of jamming sources but these jamming sources are "partial" in the sense that, whilst belonging to patterns adjacent that to which the cell concerned belong, they use only some of the same frequencies as the latter.

During transmission of radio signals between a mobile station and the base transceiver station of this cell, the jamming sources operate as such only some of the time, because of the application in the system of the invention of frequency hopping and because the sets of frequencies associated with the jamming sources are only partly identical to that of the cell concerned. In this way the level of interference, rather than being concentrated permanently on the same cycle of frequencies, is distributed in time over a plurality of cycles of frequencies so that the level of interference is everywhere below the acceptable threshold and so that the transmitted signals are usable.

If the cyclic frequency hopping principle is applied the effects of fading on the quality of the transmitted signal are reduced.

In an advantageous embodiment of the invention, the pattern being a pattern of N cells, the system of the invention has P patterns of N cells for which the sets of frequencies associated with like cells are partially identical.

N and P can be numbers with no common factor.

This yields a "pattern of patterns" made up of P "unit" patterns.

Thus in practise the invention produces a "virtual" increase in the size of the pattern used. Unlike a conventional pattern in which all the frequencies used are different in pairs, in the "pattern of patterns" obtained with the invention some frequencies are partly re-used.

This advantageously yields a "pattern" of N*P cells using a number of frequencies significantly less than the number of frequencies needed if all the frequencies of this pattern of N*P cells were different in pairs. This makes optimum use of the available frequency spectrum.

In another advantageous embodiment of the invention, the pattern being a pattern of N cells, there are P*Q patterns of N cells for which the sets of frequencies associated with like cells are partially identical.

N is equal to 9, P is equal to 4 and Q is equal to 13, for example.

The system of the invention can advantageously use the time division multiple access (TDMA) principle. In this case the frequency can be changed in each time slot, for example.

The present invention also concerns an operation and maintenance unit of a cellular mobile radio system of the invention as defined above, this unit comprising means for assigning frequencies to each cell of said system, characterized in that said assignment means are such that the sets of frequencies associated with any two like cells, i.e. cells belonging to different and adjacent patterns and occupying within the respective patterns the same position relative to the other cells of the patterns, are partially identical, i.e. they comprise at least one identical frequency and at least one different frequency, and such that the plan of this mobile radio system is obtained by superposing the plans of a plurality of mobile radio systems each having a different number of cells per pattern, these mobile radio systems being conventional systems, i.e. systems in which the sets of frequencies associated with like cells are identical.

Other features and advantages of the present invention will emerge from the following description of one specific embodiment of the invention given by way of non-limiting illustrative example only.

DETAILED DESCRIPTION OF THE PREFERRED EMBODIMENT

The same items are identified by the same reference number or letter in all figures in which they appear.

The figures relate to the advantageous situation in which cyclic frequency hopping is used, for example.

Figure 1:
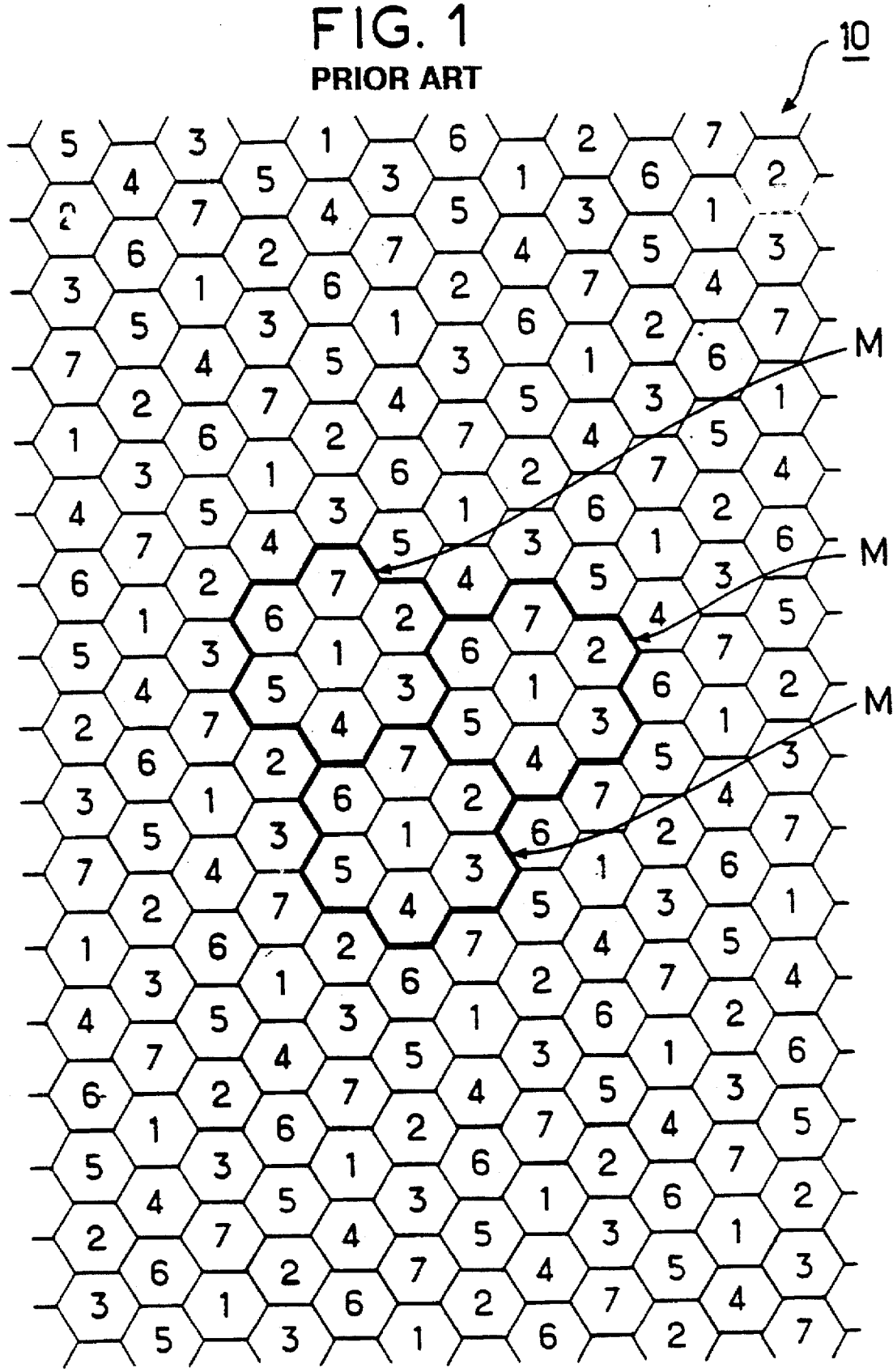
FIG. 1 is a highly schematic representation of a conventional (prior art) cellular mobile radio system using a pattern of seven cells.

FIG. 1 shows the plan of a conventional cellular mobile radio system 10. The cells of a system of this kind can be schematically represented as hexagons.

The plan of the system 10 is constituted of the regular repetition in space of a pattern M comprising seven cells 1 through 7. Cell 1 is at the center of the pattern M and cells 2 through 7 surround the cell 1. The contours of each pattern M are shown in bold line in FIG. 1.

It is assumed, by way of example, that each of the cells 1 through 7 is associated with a set of three frequencies, the 21 frequencies thus used in a given pattern M being all different. Each of these sets of frequencies is denoted hereinafter by the same reference number or letter as the cell of the pattern M with which it is associated.

Figure 2:
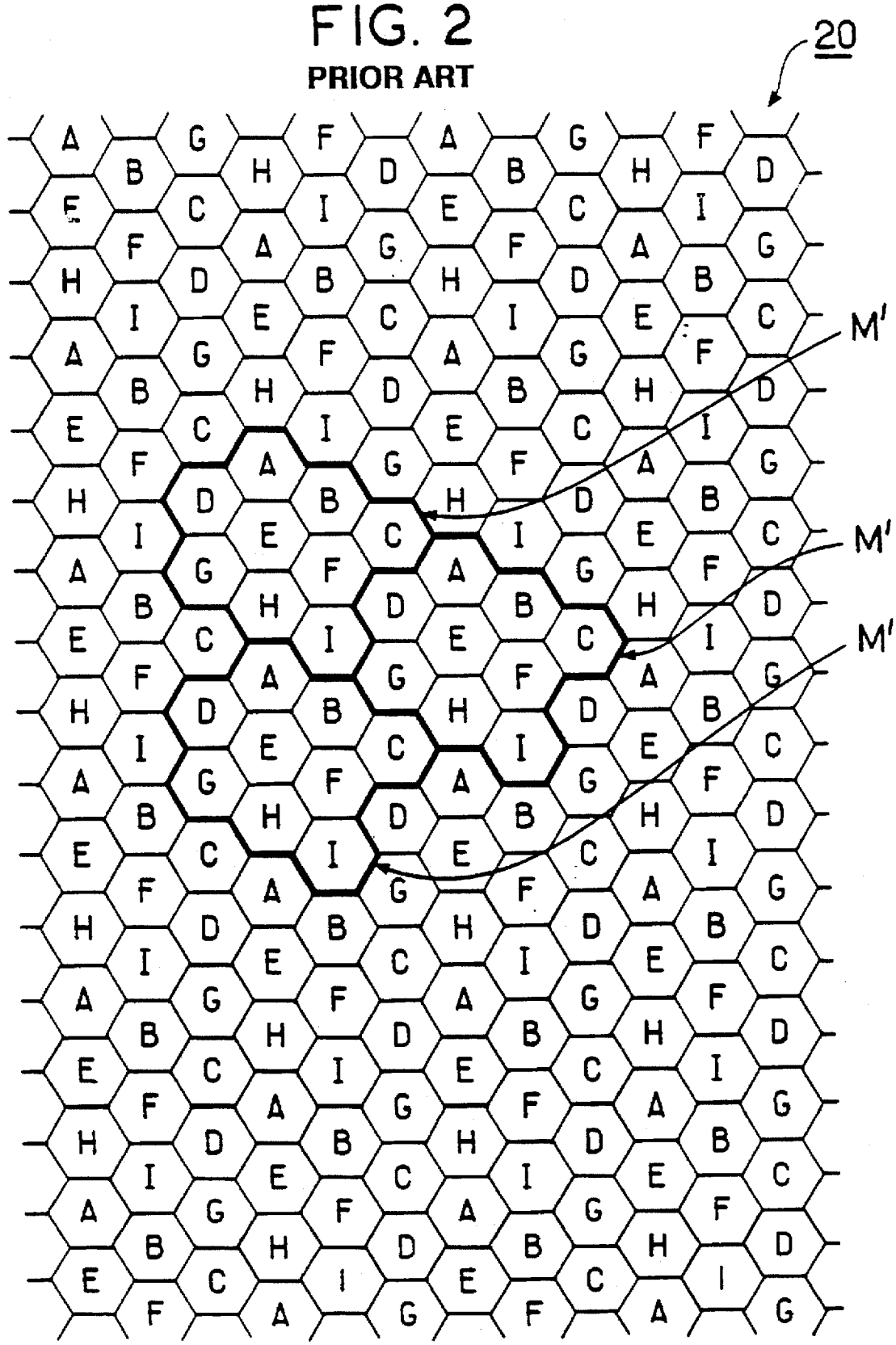
FIG. 2 is a highly schematic representation of a conventional (prior art) cellular mobile radio system using a pattern of nine cells.

FIG. 2 shows the plan of another conventional cellular mobile radio system 20.

The plan of the system 20 is constituted by the regular repetition of a pattern M' comprising nine cells A through I. The contour of each pattern M' is shown in bold line in FIG. 2.

Again by way of example, it is assumed that each of the cells A through I is associated with a single frequency. Hereinafter each of these frequencies is denoted by the same reference number or letter as the cell of the pattern M' with which it is associated.

Figure 3:
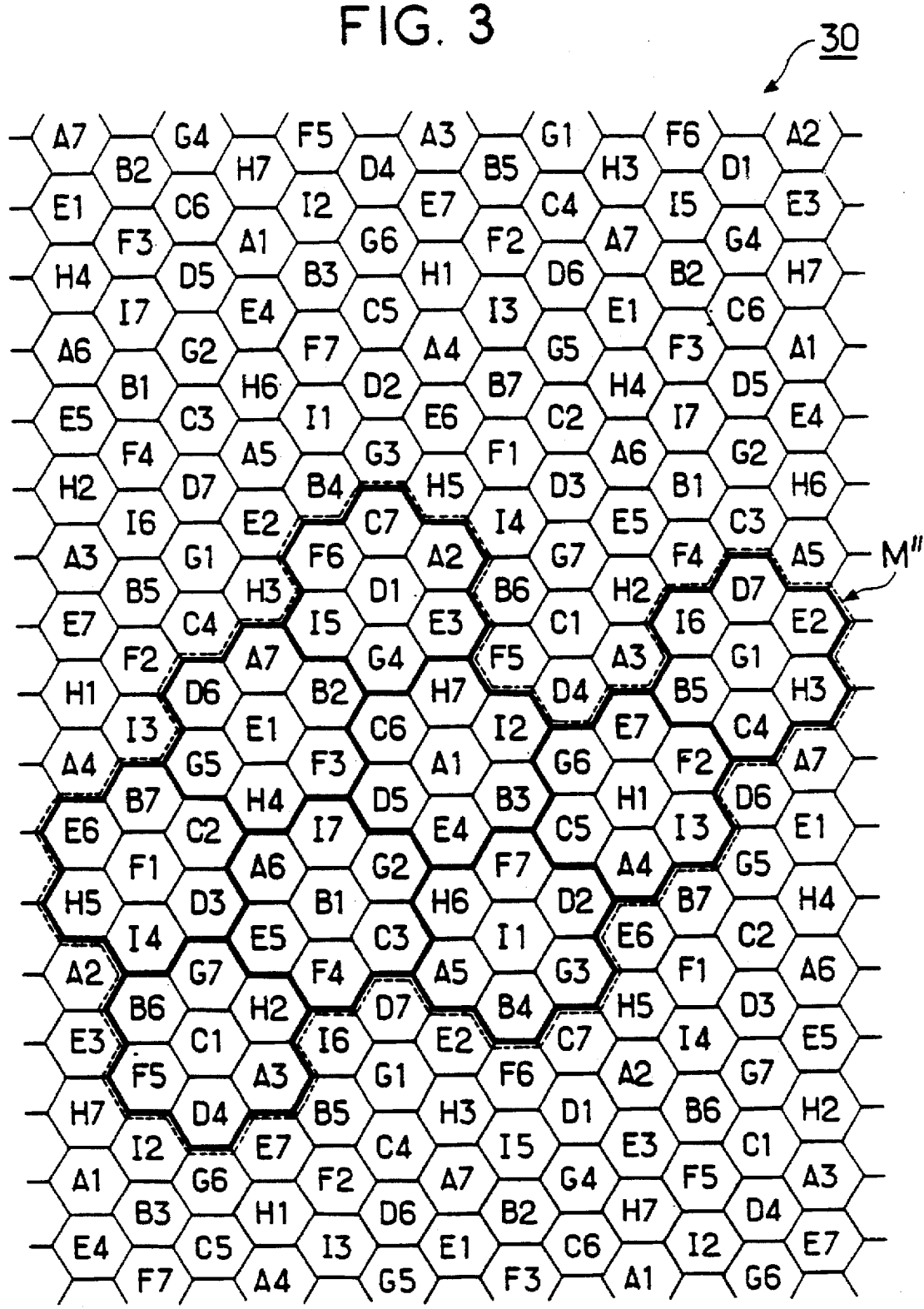
FIG. 3 is a highly schematic representation of a cellular mobile radio system of the invention.

FIG. 3 shows the plan of a cellular mobile radio system 30 of the invention. This plan is obtained by superposing the plans of the systems 10 and 20. The reference symbols of the cells of the system 30 are obtained by juxtaposing the reference number and letter of the superposed cells of the systems 10 and 20 corresponding to them, starting with the letter. For example, the cell resulting from the superposition of the cells 1 and A is denoted A1. The same convention is applied to the resulting sets of frequencies.

The contours of the original M patterns are still shown in bold lines because the patterns M constitute the basic pattern of the system 30 of the invention. However, unlike the conventional system 10, and because of the superposition of the plans of the system 10 and 20, the like cells of two adjacent patterns M do not use exactly the same sets of frequencies.

For example, the cells A1 and B1, which are the central cells of two adjacent patterns, share the frequencies of the set 1 of frequencies but their associated complete sets of frequencies differ in frequencies A and B.

In this way there is a created a "pattern of patterns" with 63=(9*7) cells identified by the reference symbol M" in FIG. 3 and whose contours are shown in dashed line. Each cell is associated with a set of four (3+1) frequencies. Unlike a conventional pattern all the frequencies used within this "pattern" are not different.

Fewer frequencies are therefore used than in a conventional pattern of 63 cells each associated with a set of four frequencies, with the 252=(63*4) frequencies used in this pattern being all different. The pattern M" of the invention uses only 30=(7*3+9) different frequencies.

Performance in terms of the transmitted radio signal quality in a system using a pattern of 63 cells and 252 frequencies and in a system of the invention will now be compared.

It is obvious that, for identical cell sizes, deterioration due to interference is much less in a system using patterns of 63 cells and 252 frequencies than in a system using "patterns" of 63 cells and 30 frequencies. In a system like that shown in FIG. 3 the number of potential near jamming sources is large even within the pattern. However, as already explained, these jamming sources are "partial" jamming sources since their sets of frequencies all differ partly from each other and because cyclic frequency hopping is used.

The combined advantages of cyclic frequency hopping and random frequency hopping are obtained in this way using only cyclic frequency hopping.

It is well known that the advantage of random frequency hopping applied on its own in a conventional system resides in the fact that the level of interference varies during a given transmission of signals between a mobile station and a base transceiver station, while the level of interference is practically constant when the cyclic frequency hopping principle is applied. Random frequency hopping "averages out" the interference.

This is explained by the fact that the level of interference perceived during a transmission is the average of the levels of interference caused by many other transmissions. As a result, the more jamming sources the better is the system in terms of interference. This principle is called jammer diversity.

In the system shown in FIG. 3 jammer diversity is achieved not by applying the principle of random frequency hopping but by partially re-using some frequencies in adjacent patterns and applying cyclic hopping to those frequencies.

The advantages of random frequency hopping are thus obtained in systems of the invention because the interference varies with time (for example from one time slot to another for systems using the TDMA principle).

In GSM systems which utilize the TDMA principle a signalling frequency must be partly reserved (usually this means reserved during the first time slot) in each cell for transmission of signals containing signalling between the mobile stations and the base transceiver station. The GSM standard prohibits application of frequency hopping to the logical channel characterized by the first time slot of each frame and the signalling frequency.

Consequently, in the above example of implementation of the present invention the provisions of the standard must be complied with if the system concerned is a GSM system. The frequency hopping principle can nevertheless be applied to time slots other than the first time slot of each frame on the signalling frequency, i.e. for logical channels other than the signalling channel.

Implementation of the invention in existing GSM cellular mobile radio systems does not require any modification of the mobile stations or the base transceiver stations. The equipment for applying one or other of the frequency hopping principles already exists in the latter, under the GSM standard.

Given that the invention uses the principle of frequency hopping in the conventional way and that the only change as compared with the prior art is the distribution of the frequencies, it is not necessary to modify the mobile stations or the base transceiver stations.

On the other hand, the system unit responsible for operation and maintenance has to have its frequency planning software modified in accordance with the principle of the present invention.

This operation and maintenance unit transmits the frequency plan for application in the field to the various base station controllers each responsible for a predetermined group of base transceiver stations.

Figure 4:
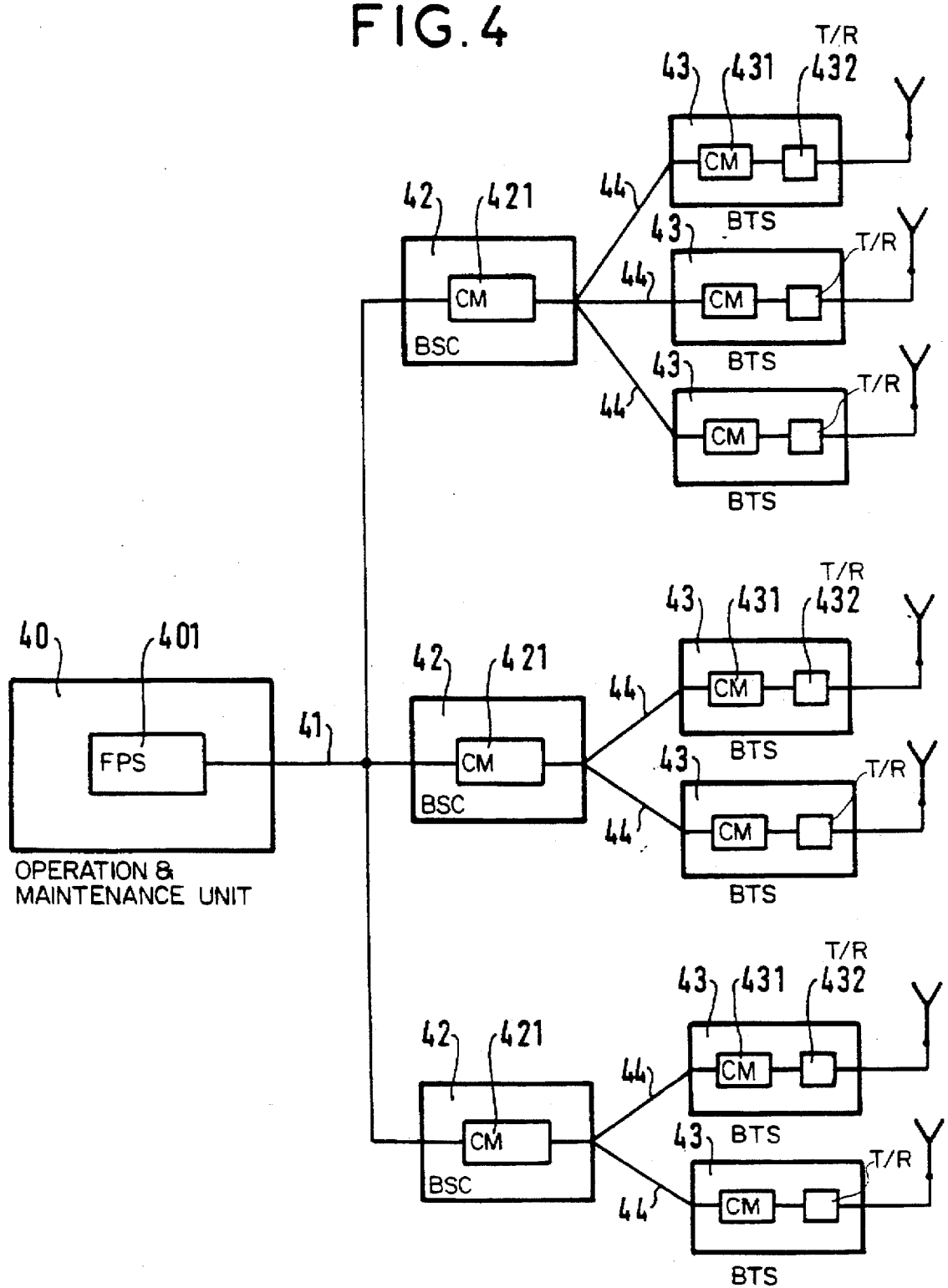
FIG. 4 is a block schematic of the main infrastructure elements of a cellular mobile radio system of the present invention.

FIG. 4 shows an operation and maintenance unit 40 running frequency planning software 401. The unit 40 is connected, usually by a cable link 41, to a plurality of base station controllers (BSC) 42 (three of these are shown in FIG. 4), which are in turn connected to the base transceiver stations 43 for which they are responsible by cable links 44. Note that FIG. 4 shows only elements directly relevant to implementation of the invention.

The frequency planning software 401 programmed in accordance with the principle of the present invention drives control means 421 belonging to the base station controllers BSC so that the appropriate frequencies are allocated to each cell (i.e. to each of the appropriate control means 431 in the base transceiver stations 43, in turn connected to the transmit/receive means 432 of the latter).

For systems in which the application of frequency hopping is not provided for initially, it is necessary to modify the mobile stations, the base transceiver stations and the operation and maintenance units, as follows:

to install at the base transceiver station the additional transceivers required (the number required is the same as the number of frequencies in the associated set of frequencies), together with appropriate switching means if not already available, or to equip the transceiver(s) of the base transceiver station with frequency synthesizers, to carry out the same modification on the mobile stations, to modify the operation and maintenance software so that the frequency plan conforms to that of the present invention.

Of course, the embodiment described hereinabove is merely one example of application of the invention.

For example, it is possible to obtain systems in accordance with the present invention by "superposing" more than two conventional systems.

Similarly, it is not necessary for the number of cells in the superposed systems to have no common factors, although this does achieve optimal frequency use.

For example, a cellular system plan in accordance with the present invention can be obtained by superposing the plans of three conventional systems with 9, 12 and 13 cells, respectively. This creates a "pattern of patterns" with 468 (9*4*13) cells, 36 (9*4) being the lowest common multiple of 9 and 12, the basic pattern of the system of the invention being a pattern of nine cells.

If each cell of this pattern of nine cells is associated with three frequencies (for example because in each of the conventional systems used a single frequency is associated with each cell), the partially identical sets of frequencies of two like cells belonging to adjacent patterns then differ by two frequencies.

The advantages obtained with a system of this kind are identical to those obtained with the system 30 of FIG. 3.

The invention also applies to systems in which some cells are "sectorized", each sector having transceiver means so that it is equivalent to a cell. Throughout the foregoing description the word "cell" is to be understood as having this broad meaning.

Two "adjacent" patterns are side by side, i.e. they are not separated by any other pattern but they do not necessarily have a common boundary. Similarly, the cells of the same pattern do not necessarily have a common boundary.

The cells of the same pattern have been shown as identical hexagons. This form of representation is schematic, however, since the cells can have any contour and it is not necessary for all the cells to have exactly the same area and exactly the same shape.

Nor is it necessary for all the sets of frequencies to comprise exactly the same number of frequencies.

Finally, any means as described can be replaced by equivalent means without departing from the scope of the invention.

Here is claimed:

1. A cellular mobile radio system comprising a plurality of cells grouped into identical patterns, each of at least two cells, repeated periodically in space and such that:

each of a plurality of base tranceiver means is associated with only one of said cells and is adapted to send radio signals to and to receive radio signals from mobile stations when the mobile stations are located in a geographical area substantially coincident with the cell associated therewith;

each of said base transceiver means sends and receives radio signals using a set of frequencies associated with said associated cell and including at least two different frequencies, all the frequencies of sets of frequencies associated with cells of the same pattern being different;

the frequency of the radio signals exchanged between a mobile station and the transceiver means of a cell changes in time so that several frequencies of the set of frequencies associated with said cell are used successively during the transmission of said radio signals;

like cells being any two cells that respectively occupy in different ones of said identical patterns the same position relative to other cells within respective ones of said identical patterns, the sets of frequencies associated with any two like cells include at least one identical frequency and at least one different frequency;

in which system a plan of said mobile radio system is obtained by superposing plans of a plurality of mobile radio systems each having a different number of cells per pattern, these mobile radio systems being systems in which the sets of frequencies associated with like cells are identical.

2. The system according to claim 1 wherein, said pattern (M) being a pattern of N cells, there are P patterns of N cells for which the sets of frequencies associated with like cells are partially identical.

3. The system according to claim 2 wherein N and P are numbers with no common factor.

4. The system according to claim 2 wherein N is equal to 7 and P is equal to 9.

5. The system according to claim 2 wherein each cell of said pattern of N cells is associated with at least three frequencies and in that the partially identical sets of two like cells belonging to adjacent patterns differ by one frequency only.

6. The system according to claim 1 wherein, said pattern being a pattern of N cells, there are P*Q patterns of N cells for which the sets of frequencies associated with like cells are partially identical.

7. The system according to claim 6 wherein N is equal to 9, P is equal to 4 and Q is equal to 13.

8. The system according to claim 6 wherein each cell of said pattern of N cells is associated with at least three frequencies and in that the partially identical sets of two like cells belonging to adjacent patterns differ by two frequencies.

9. The system according to claim 1 wherein said patterns are repeated regularly.

10. The system according to claim 1 wherein when a signalling frequency is partly reserved for transmission of signalling between a mobile station and base transceiver means, the frequency at which said signalling is transmitted is always said signalling frequency and does not change during transmission of said signally.

11. The system according to claim 1 using the principle of time division multiple access.

12. The system according to claim 1 wherein the time succession of said frequencies is cyclic and follows a predetermined cycle.

13. The cellular mobile radio system according to claim 1 further comprising an operation and maintenance unit that assigns frequencies to each cell of said system.

14. A cellular mobile radio system comprising:

a plurality of cells grouped into identical first frequency use patterns repeated periodically in space, each of said first frequency use patterns including at least two cells; and a plurality of base transceiver means each associated with only one of said cells and being adapted to send radio signals to and to receive radio signals from mobile stations when the mobile stations are located in a geographical area substantially coincident with the cell associated therewith, wherein:

each of said base transceiver means sends and receives radio signals using a set of first frequencies associated with said associated cell and including at least two different frequencies, all the frequencies of sets of frequencies associated with cells within one of said first frequency patterns being different;

said plurality of cells is grouped into identical second frequency use patterns repeated periodically in space, each of said second frequency use patterns including at least two cells;

each of said base transceiver means sends and receives radio signals using a set of second frequencies associated with said associated cell, all the frequencies of sets of frequencies associated with cells within a second frequency pattern being different;

some but not all of the frequencies used in a first cell occupying a position within one of said first frequency use patterns are the same as the frequencies used in a second cell occupying a same position within another of said first frequency use patterns; and the frequency of the radio signals exchanged between a mobile station and the base transceiver means of a cell changes in time so that frequencies of the set of first frequencies associated with said cell and frequencies of the set of second frequencies associated with said cell are used successively during the transmission of said radio signals.

* * * * *